(12) United States Patent
Yeh et al.

(10) Patent No.: US 9,369,753 B2
(45) Date of Patent: *Jun. 14, 2016

(54) METHODS, SYSTEMS, AND MEDIA FOR CONTROLLING A BI-DIRECTIONAL HDMI PORT

(71) Applicant: Google Inc., Mountain View, CA (US)

(72) Inventors: Chia Hang Yeh, Taipei (TW); Yuan-Jen Chang, Taipei (TW)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,050

(22) Filed: Nov. 6, 2015

(65) Prior Publication Data

US 2016/0066016 A1    Mar. 3, 2016

Related U.S. Application Data

(63) Continuation of application No. 14/327,925, filed on Jul. 10, 2014, now Pat. No. 9,215,491.

(51) Int. Cl.
*G06F 3/00* (2006.01)
*H04N 21/426* (2011.01)
*H04N 21/4363* (2011.01)
*H04N 5/63* (2006.01)

(52) U.S. Cl.
CPC ......... *H04N 21/42607* (2013.01); *H04N 5/63* (2013.01); *H04N 21/43635* (2013.01)

(58) Field of Classification Search
None
See application file for complete search history.

(56) References Cited

U.S. PATENT DOCUMENTS

| | | | | |
|---|---|---|---|---|
| 2009/0174817 | A1* | 7/2009 | Sato | G09G 5/006 348/554 |
| 2011/0283129 | A1* | 11/2011 | Guillerm | G09G 5/006 713/324 |
| 2012/0274857 | A1* | 11/2012 | Maxwell | H04L 12/12 348/720 |
| 2015/0067195 | A1* | 3/2015 | Sharma | G06F 13/385 710/14 |

* cited by examiner

*Primary Examiner* — David E Martinez
(74) *Attorney, Agent, or Firm* — Byrne Poh LLP (57) ABSTRACT

In accordance with some implementations of the disclosed subject matter, a method for controlling a High-Definition Multimedia Interface (HDMI) port is provided, the method comprising: generating a first voltage at a first pin of the HDMI port; detecting a second voltage at the first pin of the HDMI port; detecting a third voltage at a second pin of the HDMI port; comparing the second voltage to the first voltage; comparing the second voltage to the third voltage; determining based on the comparison of the second voltage to the third voltage that the HDMI port of the device is connected to an HDMI source; causing the HDMI port to act as an HDMI sink; determining based on the comparison of the second voltage to the first voltage that the HDMI port of the device is connected to an HDMI sink; and causing the HDMI port to act as an HDMI source.

23 Claims, 8 Drawing Sheets

FIG. 5

METHODS, SYSTEMS, AND MEDIA FOR CONTROLLING A BI-DIRECTIONAL HDMI PORT

CROSS-REFERENCE TO RELATED APPLICATIONS

This application is a continuation of U.S. patent application Ser. No. 14/327,925, filed Jul. 10, 2014, which is hereby incorporated by reference herein in its entirety.

TECHNICAL FIELD

The disclosed subject matter relates to methods, systems, and media for controlling a bi-directional HDMI port.

BACKGROUND

Typical High-Definition Multimedia Interface (HDMI) ports are either an output of data from a source device (e.g., a source of audio and/or video data such as a set-top box, a digital media receiver, an optical media player, etc.) or an input of data to a sink device (e.g., a receiver of audio and/or video data such as an A/V receiver, monitors, entertainment systems, television sets, speakers, headphones etc.). In general, an HDMI port in a device is connected to an HDMI connector and uses a unidirectional interface to transmit audio and/or video data, for example from an HDMI source to an HDMI sink so that the audio and/or video data can be presented. In such an implementation, for a device to receive audio and/or video data and also output audio and/or video data, separate HDMI ports are required for each function.

Moreover, particular devices, such as an A/V receiver or a monitor, have the capability of supporting both the input and the output of data. This can be a source of confusion for users, particularly when these users are setting up or configuring such devices.

Accordingly, it is desirable to provide methods, systems and media for controlling a bi-directional HDMI port.

SUMMARY

In accordance with various implementations of the disclosed subject matter, methods, systems, and media for controlling a bi-directional HDMI port are provided.

In accordance with some implementations of the disclosed subject matter, a method for controlling a bi-directional HDMI port are provided, the method comprising: generating a first voltage at a first pin of the HDMI port; detecting a second voltage at the first pin of the HDMI port; detecting a third voltage at a second pin of the HDMI port; comparing the second voltage to the first voltage; comparing the second voltage to the third voltage; determining based on the comparison of the second voltage to the third voltage that the HDMI port of the device is connected to an HDMI source; causing the HDMI port to act as an HDMI sink based on the determination that the HDMI port is connected to the HDMI source; determining based on the comparison of the second voltage to the first voltage that the HDMI port of the device is connected to an HDMI sink; and causing the HDMI port to act as an HDMI source based on the determination that the HDMI port is connected to the HDMI sink.

In accordance with some implementations of the disclosed subject matter, a system for controlling a bi-directional HDMI port are provided, the system comprising: a switch having a first side coupled to a first pin and a second side coupled to a second pin of the HDMI port; a voltage source coupled to the first side of the switch; a diode with a first side coupled to the first side of the switch and a second side coupled to a signal source; a resistor with a first side coupled to the second pin of the HDMI port and a second side coupled to ground; and at least one hardware processor that: calculates a first voltage difference between the node and the signal source; calculates a second voltage difference between the node and the second side of the switch; compares the first voltage and the second voltage; determines based on the comparison that the HDMI port of the device is connected to an HDMI source; causes the HDMI port to act as an HDMI sink based on the determination that the HDMI port is connected to the HDMI source; determines based on the comparison that the HDMI port of the device is connected to an HDMI sink; and causes the HDMI port to act as an HDMI source based on the determination that the HDMI port is connected to the HDMI sink.

In accordance with some implementations of the disclosed subject matter, a non-transitory computer readable medium containing computer executable instructions that, when executed by a processor, cause the processor to perform a method for controlling a High-Definition Multimedia Interface (HDMI) port in a device connected to an HDMI connector, the method comprising: generating a first voltage at a first pin of the HDMI port; detecting a second voltage at the first pin of the HDMI port; detecting a third voltage at a second pin of the HDMI port; comparing the second voltage to the first voltage; comparing the second voltage to the third voltage; determining based on the comparison of the second voltage to the third voltage that the HDMI port of the device is connected to an HDMI source; causing the HDMI port to act as an HDMI sink based on the determination that the HDMI port is connected to the HDMI source; determining based on the comparison of the second voltage to the first voltage that the HDMI port of the device is connected to an HDMI sink; and causing the HDMI port to act as an HDMI source based on the determination that the HDMI port is connected to the HDMI sink.

In accordance with some implementations of the disclosed subject matter, a system for controlling a High-Definition Multimedia Interface (HDMI) port in a device connected to an HDMI connector is provided, the system comprising: switching means for interrupting a flow of current, having a first side coupled to a first pin and a second side coupled to a second pin of the HDMI port; means for generating a voltage at the first side of the switch; means for allowing a unidirectional flow of current from a voltage signal source to the first side of the switch; means for coupling the second pin of the HDMI port to ground; means for calculating a first voltage difference between the first pin and the signal source; means for calculating a second voltage difference between the first pin and the second side of the switch; means for comparing the first voltage and the second voltage; means for determining based on the comparison that the HDMI port of the device is connected to an HDMI source; means for causing the HDMI port to act as an HDMI sink based on the determination that the HDMI port is connected to the HDMI source; means for determining based on the comparison that the HDMI port of the device is connected to an HDMI sink; and means for causing the HDMI port to act as an HDMI source based on the determination that the HDMI port is connected to the HDMI sink.

In some implementations, the system further comprises means for determining based on the comparison of the first voltage and the second voltage that the HDMI port of the device is connected to a bi-directional HDMI port; and means for causing the device comprising the HDMI port to prompt a user to set the HDMI port to act as an HDMI source or an HDMI sink based on the determination that the HDMI port is connected to the bi-directional HDMI port.

In some implementations, the system further comprises means for causing the HDMI port to act as a sink for multimedia data during a first period of time during which the HDMI port is connected to an HDMI source and act as a source during a second period of time during which the HDMI port is connected to an HDMI sink.

In some implementations, the first pin is pin 18.

In some implementations, the second pin is pin 19.

In some implementations, the means for generating a voltage generates a voltage with a magnitude of 5 Volts.

In some implementations, the voltage signal source is a 3.3 Volt signal with a frequency of 1 Hertz.

In some implementations, the system further comprises means for determining that the HDMI port is set as a sink based on the second voltage difference being between 5 Volts.

In some implementations, the system further comprises means for determining that the HDMI port is set as a source based on the first voltage difference being 0 Volts.

In some implementations, the system further comprises means for determining that the device comprising the HDMI port is a sink or a source based on prompting the user to set the HDMI port to act as a sink or a source if the second voltage difference is a 3.3 Volt pulse signal.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various implementations, mechanisms which include methods, media and systems for controlling a bi-directional HDMI port are provided.

In some implementations, the mechanisms described herein can be used to determine that a bi-directional HDMI port outputs data or inputs data and is connected to either an HDMI sink device (e.g., a receiver of audio and/or video data such as an A/V receiver, monitors, entertainment systems, television sets, speakers, headphones etc.), an HDMI source device (e.g., a source of audio and/or video data such as a set-top box, a digital media receiver, an optical media player, etc.), and/or a device with another bi-directional HDMI port. Additionally, the device that includes the bi-directional HDMI port can be set to act as an HDMI source and/or an HDMI sink based on the determination that the HDMI port is connected to an HDMI sink and/or an HDMI source.

In some implementations, the bi-directional HDMI port can be used in a device that can act as an HDMI sink during a first period of time and an HDMI source during a second period of time. For example, the HDMI port can be used in a device, such as a personal computer, a general purpose computer, a server, a mobile phone, a tablet and/or any suitable device that can act as a source and/or a sink. In some such implementations, the HDMI port can prompt the device to request a user to set the HDMI device as a source or a sink. As a further example, in some implementations, a personal computer with a bi-directional HDMI port connected to the output data port of a set-box acts as a sink device and a personal computer with a bi-directional HDMI port connected to the input data port of a monitor acts as a source device.

Figure 1A:
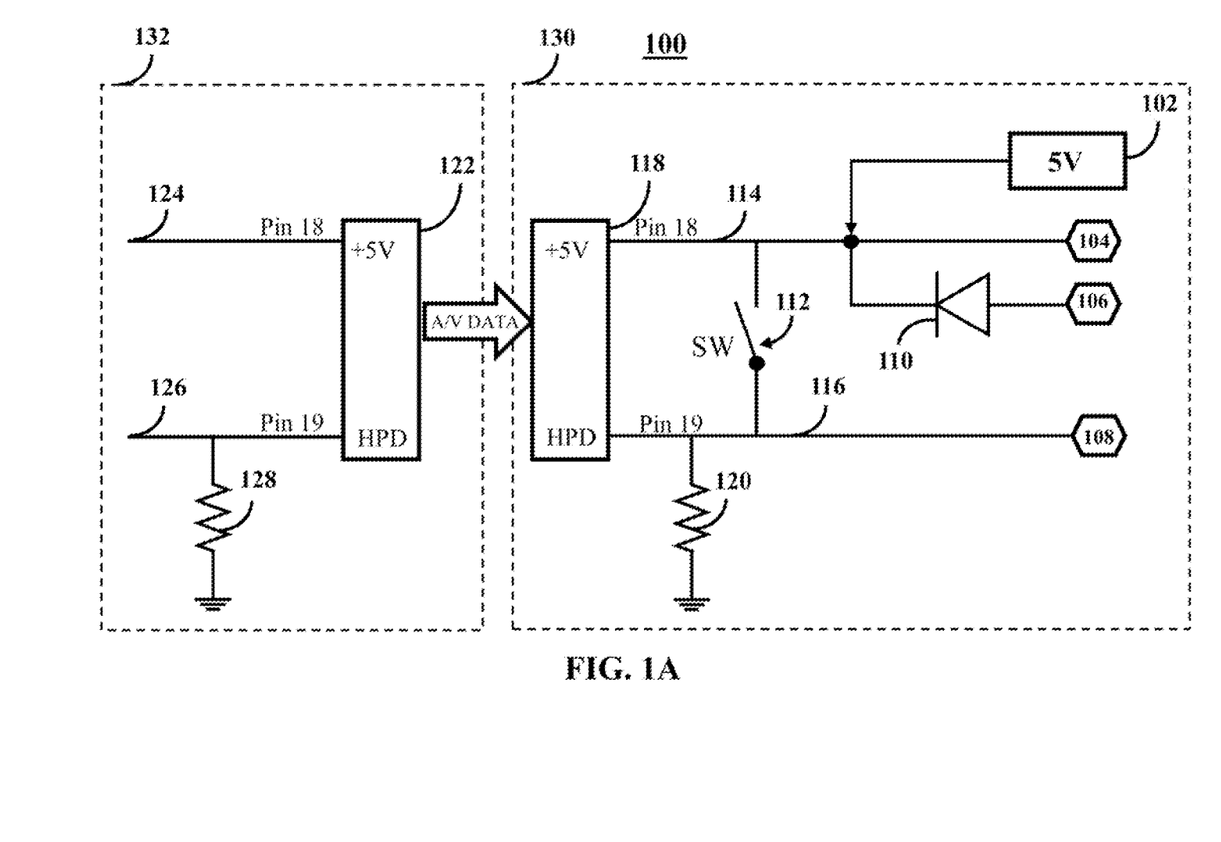
FIGS. 1A-1B show an example of a circuit for a bi-directional HDMI port connected to an HDMI source device and corresponding waveforms in accordance with some implementations of the disclosed subject matter.

FIG. 1A shows an example 100 of a circuit with a bi-directional HDMI port connected to an HDMI source device in accordance with some implementations of the disclosed subject matter. As shown in FIG. 1A, a bi-directional HDMI port 130 in an HDMI device is connected to a source HDMI port 132 of a source device. In some such implementations, source HDMI port 132 can be connected to HDMI port 130 using an HDMI connector 122 that includes a number of pins. For example, HDMI port 132 of a source device can include line 124 that carries a power supply voltage, and can be electrically coupled to pin 18 of a type A HDMI port or any other suitable pin and/or combination of pins in any suitable type of port. As another example, line 126 of HDMI port 132 of a source device can receive a voltage from a corresponding pin of a connector 118 of bi-directional HDMI port 130. The voltage received on line 126 can be used to determine whether HDMI port 132 is connected to an HDMI sink by acting as a Hot-Plug Detection (HPD) line.

In some implementations, HDMI port 132 of a source device can include a resistor 128 with a first side coupled to line 126 of HDMI port 132 and a second side coupled to ground.

In some implementations, bi-directional HDMI port 130 can include a number of pins that correspond to HDMI connector 118. For example, bi-directional HDMI port 130 of an HDMI device can include line 114 that carries a power supply voltage, such as pin 18 of a type A HDMI port or any other suitable pin and/or combination of pins in any suitable type of port. As another example, bi-directional HDMI port 130 can include line 116 that can provide a voltage to a corresponding pin of connector 122 and can be used when HDMI port 130 is connected to an HDMI source by acting as a Hot-Plug Detection (HPD) line.

In some implementations, bi-directional HDMI port 130 can include a resistor 120 with a first side coupled to line 116 of HDMI port 130 and a second side coupled to ground.

In some such implementations, HDMI port 130 can include switch 112 having a first side connected to line 114 and a second side connected to line 116.

In some implementations, bi-directional HDMI port 130 can include a voltage power source 102 coupled to the first side of switch 112. For example, a voltage power source that produces a DC voltage of +5 Volts can be connected to switch 112. When switch 112 is closed, voltage supplied by voltage source 102 can be present at line 116 and can be measured at point 108, for example. In some implementations, switch 112 can be any suitable circuitry for determining the flow of current throughout the circuit, such as a relay, a mechanical switch, a MOSFET switch, and/or any other suitable component.

In some implementations, bi-directional HDMI port 130 can be controlled based on voltage measurements at points 104, 106, and/or 108. For example, to determine whether bi-directional HDMI port 130 is to be set as a sink or a source, a hardware processor and/or any other suitable logic or circuit can use measurements of a voltage difference between points 104 and 106 and/or points 104 and 108.

Figure 1B:
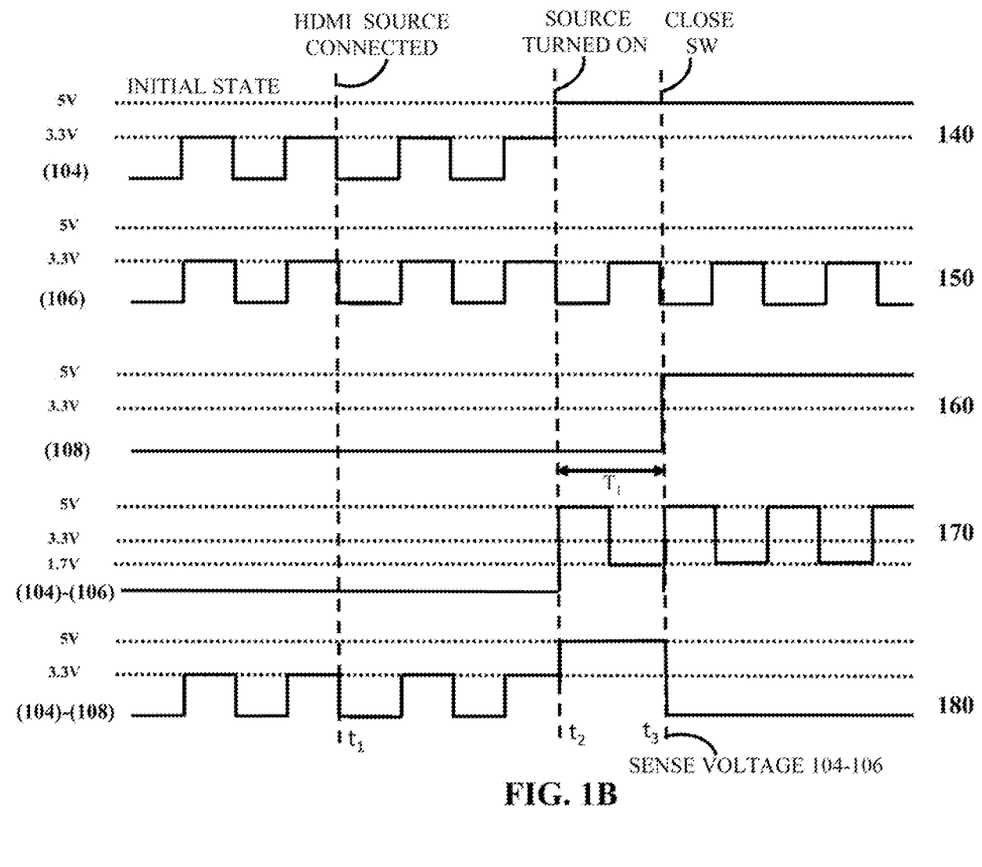

FIG. 1B shows examples of waveforms corresponding to voltage measurements at points 104, 106, and 108 and measurements of voltage differences between point 104 and point 106 (labeled as (104)-(106)) and point 104 and point 108 (labeled as (104)-(108)) when bi-directional HDMI port 130 is connected to port 132 in an HDMI source device. For example, waveform 140 shows a voltage at point 104 for different periods of time. In some such implementations, a voltage at point 106, through diode 110, can be applied to a voltage at point 104 (e.g., 1 Hertz pulse signal at 3.3 Volts) and as such without another voltage being applied to point 104, the voltage can be the same as voltage at point 106. When port 132 is an active source, a voltage power supply of +5 Volts supplied by line 124 of HDMI port 132 can be transmitted via an HDMI cable and/or any other suitable connection between port 132 and connector 118 and can be reflected in the voltage at line 114 and point 104 of bi-directional HDMI port 130, as shown in waveform 140 after time $t_2$.

An example of a waveform 150 shows a voltage at point 106 in accordance with some implementations of the disclosed subject matter. For example, a voltage at point 106 can be a 3.3 Volts pulse signal with a 1 Hertz frequency generated by a signal generator coupled to point 106.

An example of a waveform 160 shows a voltage at point 108 in accordance with some implementations of the disclosed subject matter. In some implementations, the voltage at point 108 can be at zero while switch 112 is open (e.g., before "CLOSE SW" at time $t_3$ of FIG. 1B). When switch 112 is closed, a voltage at point 108 can correspond to a voltage from line 124 arriving at line 114. For example, when switch 112 is closed, the voltage measured at 108 can be +5 Volts.

An example of a waveform 170 shows a voltage difference between point 104 and point 106 (labeled as (104)-(106)) in accordance with some implementations of the disclosed subject matter. In some implementations, the voltage difference can be zero when bi-directional HDMI port 130 is not connected to another HDMI port or while connected, for example, using an HDMI cable, to an HDMI source device that is turned off (e.g., before "SOURCE TURNED ON" at time $t_2$ of FIG. 1B). When the source device is turned on and HDMI port 132 is an active source, a voltage difference between point 104 and point 106 can correspond to the difference between a voltage from line 124 arriving at line 114 and a voltage from a signal generator received at point 106. For example, when switch 112 is closed, the voltage difference between point 104 and point 106 can be a pulse signal with a low amplitude of 1.7 Volts, corresponding to when point 106 is 3.3 Volts, a high amplitude of 5 Volts corresponding to when 106 is 0 Volts, and a frequency of 1 Hertz.

An example of a waveform 180 shows a voltage difference between point 104 and point 108 in accordance with some implementations of the disclosed subject matter. In some implementations, a voltage difference between point 104 and point 108 can correspond to the voltage measurement at point 104 while HDMI port 130 is connected to a source device, but the device is turned off (e.g., before "SOURCE TURNED ON" at time $t_2$ of FIG. 1B). When switch 112 is closed, a voltage difference between point 104 and point 108 can correspond to the difference between a voltage from line 124 arriving at line 114 and a voltage at point 104. For example, when switch 112 is open and HDMI port 132 is acting as a source while source device is turned on (e.g., after "SOURCE TURNED ON" at time $t_2$ of FIG. 1B), a voltage difference between point 104 and point 106 can be a signal with an amplitude of +5 Volts (e.g., a DC voltage of +5 Volts). As another example, when switch 112 is closed (e.g., after "CLOSE SW" at time $t_3$ of FIG. 1B), the voltage difference between point 104 and point 106 can be 0 Volts, as switch 112 provides a short between point 104 and point 106.

In some implementations, as described below in connection with process 500 of FIG. 5, a determination can be made that bi-directional HDMI port 130 is connected to a source device based on a voltage difference shown in waveform 170 and/or a voltage difference shown in waveform 180 when the device is turned on (e.g., after "SOURCE TURNED ON" at time $t_2$ of FIG. 1B). For example, in some implementations, waveform 170 during a period of time (e.g., "$T_1$" at 170) can be a pulse signal with a low amplitude of 1.7 Volts and a high amplitude of 5 Volts, with a frequency of 1 Hertz, and waveform 180 during the same period of time can be a signal with an amplitude of +5 Volts.

Figure 2A:
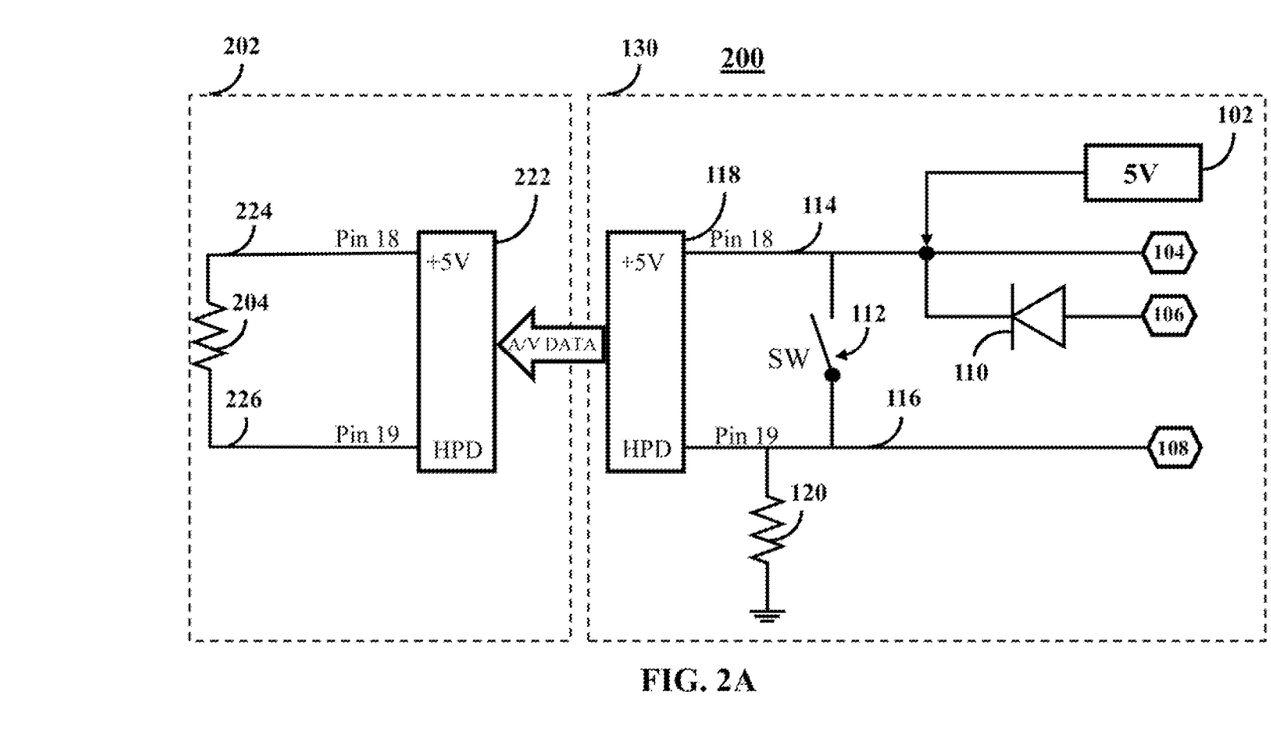
FIGS. 2A-2B show an example of a circuit for a bi-directional HDMI port connected to an HDMI sink device and corresponding waveforms in accordance with some implementations of the disclosed subject matter.

FIG. 2A shows an example 200 of a circuit with a bi-directional HDMI port connected to an HDMI sink device, in accordance with some implementations of the disclosed subject matter. As shown in FIG. 2A, a bi-directional HDMI port 130 in an HDMI device is connected to an HDMI port 202 of a sink device. In some such implementations, HDMI port 202 can be connected to HDMI port 130 using an HDMI connector 222 that includes a number of pins. For example, HDMI port 202 of a sink device can include line 224 that can receive a voltage power supply from line 114 of a connector 118, such as pin 18 of a type A HDMI port or any other suitable pin and/or combination of pins in any suitable type of port. As another example, HDMI port 202 can include line 226 that can receive the voltage power supply from line 224 and can determine whether HDMI port 202 is connected to an HDMI source.

In some implementations, HDMI port 202 of a sink device can include a resistor 204 with a first side coupled to line 224 and a second side coupled to line 226 of HDMI port 202.

In some implementations, as described above in connection with FIG. 1A, bi-directional HDMI port 130 can be controlled based on voltage measurements at points 104, 106, and/or 108.

Figure 2B:
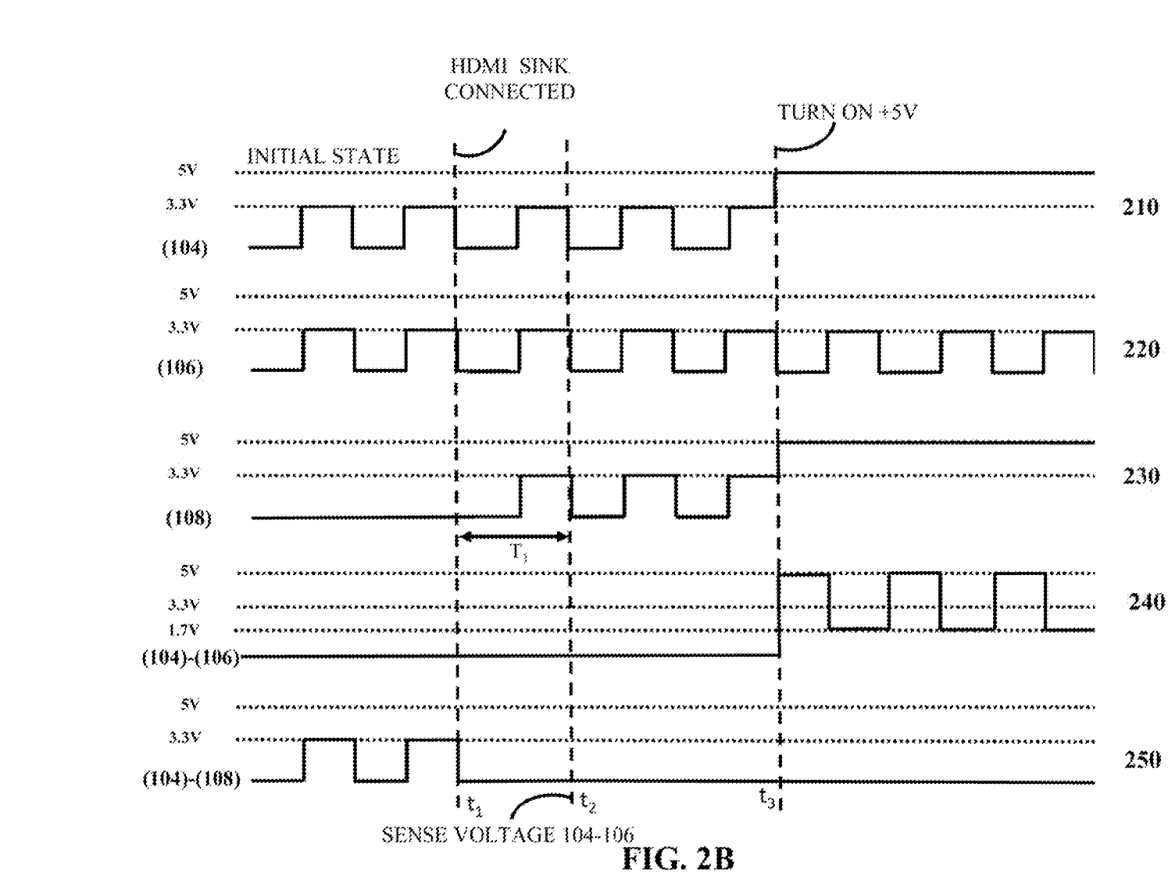

FIG. 2B shows examples of waveforms corresponding to voltage measurements at points 104, 106, 108 and measurements of voltage differences between point 104 and point 106 (labeled as (104)-(106)) and point 104 and point 108 (labeled as (104)-(108)) when bi-directional HDMI port 130 is connected to HDMI sink port 202 in an HDMI sink device using an HDMI cable. For example, waveform 210 shows a voltage at point 104 for different periods of time. In particular, in some implementations, HDMI ports 130 and 202 can be connected or disconnected. In some such implementations, a voltage at point 104 can correspond to a voltage at point 106 (e.g., 1 Hertz pulse signal at 3.3. Volts) that passes through diode 110 (e.g., at least before "TURN ON +5V" at $t_3$ of FIG. 2B). For example, when HDMI sink port 202 is connected, a voltage power supply of +5 Volts can be generated at 102 of HDMI port 130 and can be applied to point 104 of bi-directional HDMI port 130, as shown in 210.

An example of a waveform 220 shows a voltage at point 106 in accordance with some implementations of the disclosed subject matter. In some implementations, for example, a voltage at point 106 can be a 3.3 Volts pulse signal with a 1 Hertz frequency generated by a signal generator coupled to point 106.

An example of a waveform 230 shows a voltage at point 108 in accordance with some implementations of the disclosed subject matter. In some implementations, a voltage at point 108 can be zero until HDMI sink port 202 of a sink device is plugged in (e.g., before "HDMI SINK CONNECTED" at $t_1$ of FIG. 2B). For example, when the HDMI sink port 202 is plugged in and a voltage from power supply 102 is not applied to 104, a voltage at point 108 can correspond to voltages at point 104 and point 106. In some implementations, in particular, when HDMI sink port 202 is plugged in, and a voltage from power supply 102 is not applied to 104, the pulse signal generated at point 104 (e.g., a 1 Hertz pulse signal at 3.3 Volts) can be transmitted via line 114 to connector 222 and then back to point 108 via line 116. In some such implementations, voltage power supply 102 can be turned on (e.g., at "TURN ON +5V" at $t_3$ of FIG. 2B) and the voltage at point 108 can be +5 Volts.

An example of a waveform 240 shows a voltage difference between point 104 and point 106 in accordance with some implementations of the disclosed subject matter. In some implementations, measurements of the voltage difference can be zero until voltage power supply 102 is turned on (e.g., at "TURN ON +5V" at $t_3$ of FIG. 2B) and the voltage difference between point 104 and point 106 can correspond to a difference between voltages from line 114 and voltage from a signal generator coupled to point 106. For example, when voltage power supply 102 is turned on, the voltage difference measured between point 104 and point 106 can be a pulse signal with a low amplitude of 1.7 Volts corresponding to when voltage at point 106 is 3.3 Volts, a high amplitude of +5 Volts corresponding to when voltage at point 106 is 0 Volts, and a frequency of 1 Hertz.

An example of a waveform 250 shows a voltage difference between point 104 and point 108 in accordance with some implementations of the disclosed subject matter. In some implementations, measurements of the voltage difference can correspond to a voltage at point 104 when HDMI sink port 202 is not plugged in to HDMI port 130 via a cable and/or any other suitable connector (e.g., before "HDMI SINK CONNECTED" at $t_1$ of FIG. 2B). When the HDMI sink port 202 is plugged in, measurements of the voltage difference between point 104 and point 108 can correspond to the difference between voltages from line 114 that arrive at point 108 via lines 224, 226, and voltage at point 104. For example, when the HDMI sink port 202 is connected through a cable to HDMI port 130 and the voltage power supply is turned on (e.g., "TURN ON +5V" at $t_3$ of FIG. 2B) the voltage difference measured between point 104 and point 106 can be a signal with an amplitude of 0 Volts.

In some implementations, as described below in connection with process 500 of FIG. 5, a determination can be made that bi-directional HDMI port 130 is connected to a sink device based on a voltage difference shown in waveform 240 and/or a voltage difference shown in waveform 250 when the HDMI sink port 202 is plugged in to HDMI port 130 via a cable (e.g., "HDMI SINK CONNECTED" at $t_3$ of FIG. 2B). For example, in some implementations, waveform 240 during a period of time (e.g., "$T_1$" at 240) can be a signal with an amplitude of 0 Volts and waveform 250 during the same period of time can be a signal with an amplitude of 0 Volts.

Figure 3A:
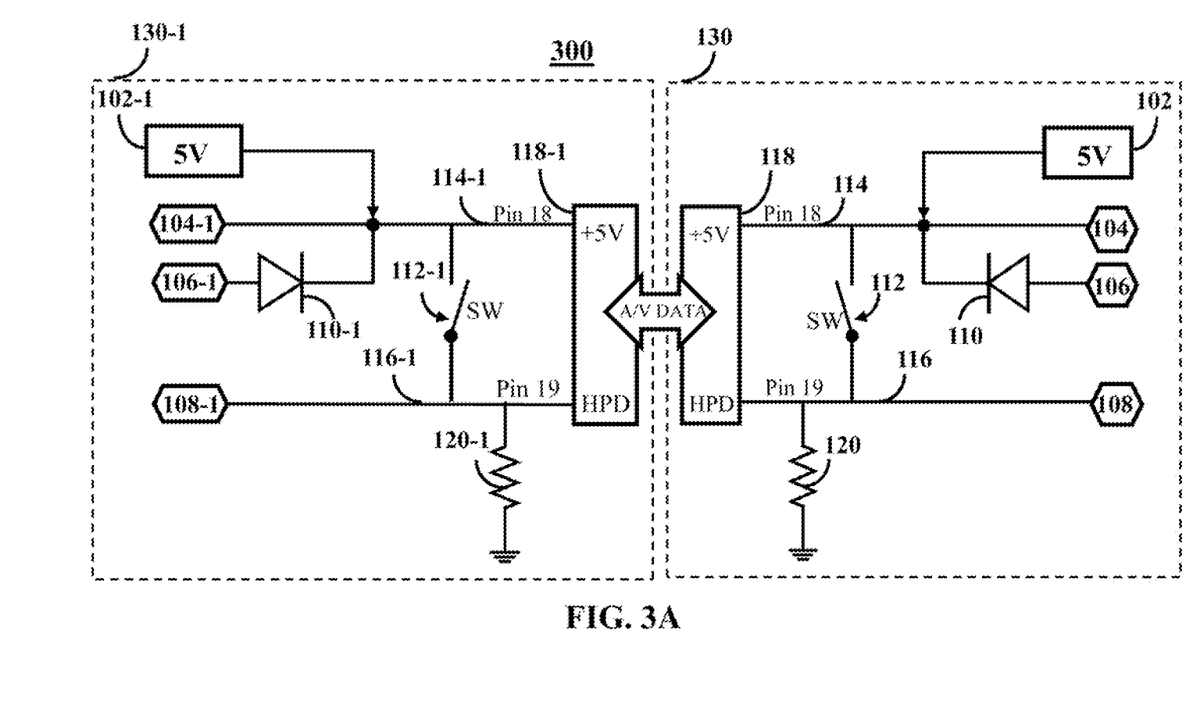
FIGS. 3A-3B show an example of a circuit for a bi-directional HDMI port connected to a device having a bi-directional HDMI port and corresponding waveforms in accordance with some implementations of the disclosed subject matter.

FIG. 3A shows an example 300 of a circuit with a first bi-directional HDMI port connected to a second bi-directional HDMI port in accordance with some implementations of the disclosed subject matter. As shown in FIG. 3A, a first bi-directional HDMI port 130 in a first HDMI device is electrically coupled to a second bi-directional HDMI port 130-1 in a second HDMI device. In some such implementations, first bi-directional HDMI port 130 is connected to second bi-directional HDMI port 130-1 using an HDMI cable and/or any other suitable connection, where first HDMI port 130 can include a connector 118 including a number of pins.

Figure 3B:
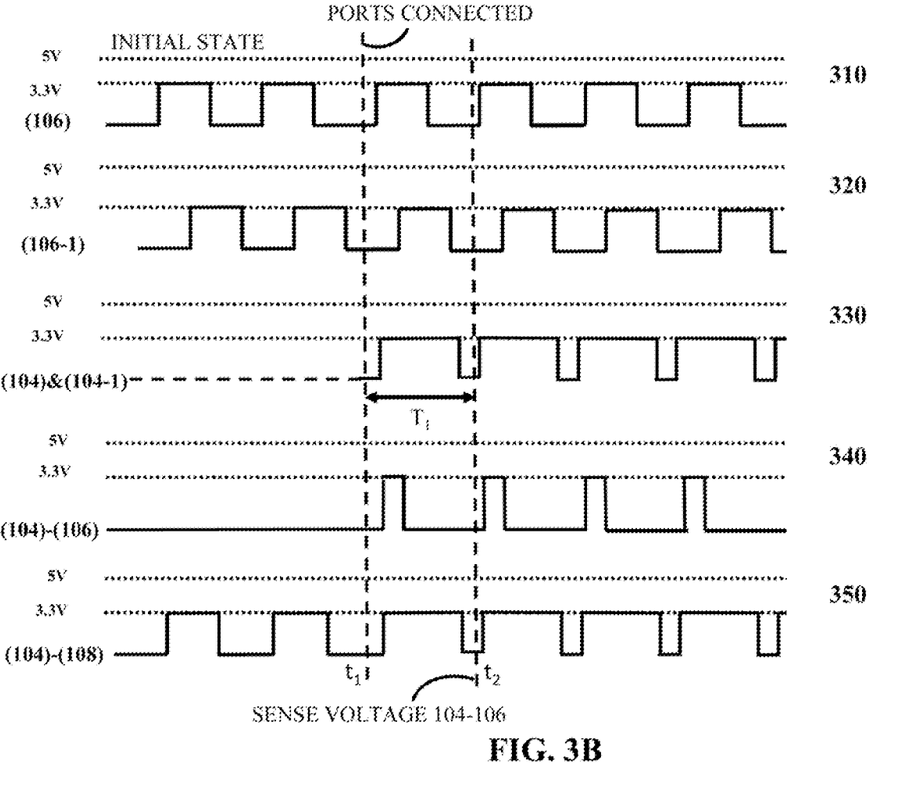

FIG. 3B shows examples of waveforms corresponding to voltages at points 104, 104-1, 106 and 106-1 of bi-directional HDMI ports 130 and 130-1. Also, FIG. 3B shows waveforms of measurements of voltage differences between point 104 and point 106 (labeled as (104)-(106)) and point 104 and point 108 (labeled as (104)-(108)) when a first bi-directional HDMI port 130 is connected to a second bi-directional HDMI port 130-1 that can be active as a sink at one time and a source at another time. For example, waveform 310 shows a voltage at point 106 for different periods of time. In some implementations, a voltage at point 106 corresponds to a generated pulse signal received at point 106 (e.g., 1 Hertz pulse signal at 3.3 Volts).

An example of a waveform 320 shows a voltage at point 106-1 of bi-directional HDMI port 130-1 in accordance with some implementations of the disclosed subject matter. In some implementations, for example, a voltage at point 106-1 can be a 3.3 Volts pulse signal with a 1 Hertz frequency generated by a signal generator coupled to point 106-1 and that starts at a different time than waveform 310 (e.g., that has a different phase from waveform 310).

An example of a waveform 330 shows a voltage at point 104 and point 104-1 in accordance with some implementations of the disclosed subject matter. In some implementations, points 104 and 104-1 can have a common voltage beginning when bi-directional HDMI ports 130 and 130-1 are connected (e.g., after "PORTS CONNECTED" at $t_1$ of FIG. 3B). For example, voltage from point 106 can be received at both points 104 and 104-1 through lines 114 and 114-1 and similarly voltage from point 106-1 can be received at both points 104 and 104-1 using the same lines. In some such implementations, for example, a voltage at points 104 and 104-1 can correspond to a sum of pulse signals at point 106 and point 106-1, resulting in a signal at points 104 and 104-1 that may have a different frequency, pulse width and/or duty cycle than the signal at point 106 and the signal at point 106-1.

An example of a waveform 340 shows a voltage difference between point 104 and point 106 (labeled as (104)-(106)) in accordance with some implementations of the disclosed subject matter. In some implementations, measurements of a voltage difference can be zero while bi-directional HDMI ports 130 and 130-1 are not connected (e.g., before "PORTS CONNECTED" at $t_1$ of FIG. 3B). For example, when bi-directional HDMI ports 130 and 130-1 are connected, the measurements of voltage difference between point 104 and point 106 can be a pulse signal at 3.3 Volts with a different a different frequency, pulse width and/or duty cycle to the one generated by a signal generator and received at point 106.

An example of a waveform 350 shows a voltage difference between point 104 and point 108 (labeled as (104)-(108)) in accordance with some implementations of the disclosed subject matter. In some implementations, measurements of the voltage difference can correspond to a voltage at point 106 while bi-directional HDMI ports 130 and 130-1 are not connected (e.g., before "PORTS CONNECTED" at $t_1$ of FIG. 3B). For example, in some implementations, the voltage difference measured between point 104 and point 106 can be a signal corresponding to the waveform shown at 330.

In some implementations, as described below in connection with process 500 of FIG. 5, a determination that a first bi-directional HDMI port 130 is connected to a second bi-directional HDMI port 130-1 can be based on a voltage shown in waveform 340 and/or a voltage shown in waveform 350 while bi-directional HDMI ports 130 and 130-1 are connected (e.g., after "PORTS CONNECTED" at $t_1$ of FIG. 3B). For example, in some implementations, the comparison of waveforms 340 and 350 during a period of time (e.g., "$T_1$" at 340) can be pulse signals each having an amplitude of 3.3 Volts, but at different frequencies, pulse widths, and/or duty cycles.

Mechanisms for controlling a bi-directional HDMI port can be implemented using any suitable hardware in some implementations. For example, in some implementations, comparing the first voltage to the second voltage and determining based on the comparison that the HDMI device is connected to an HDMI source and/or sink can be implemented using any suitable general purpose computer or special purpose computer and/or server. In a more particular example, a bi-directional HDMI port can be included in a mobile device (e.g., mobile phone, tablet etc.) and may be controlled using a special purpose computer that includes a Field Programmable Gate Array (FPGA). In yet another example, a bi-directional HDMI port can be included in a mobile device and may be controlled using a general purpose computer that includes a Central Processing Unit (CPU). Any such special purpose computer or general purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, a bus 418, and a bi-directional HDMI port 420.

Figure 4:
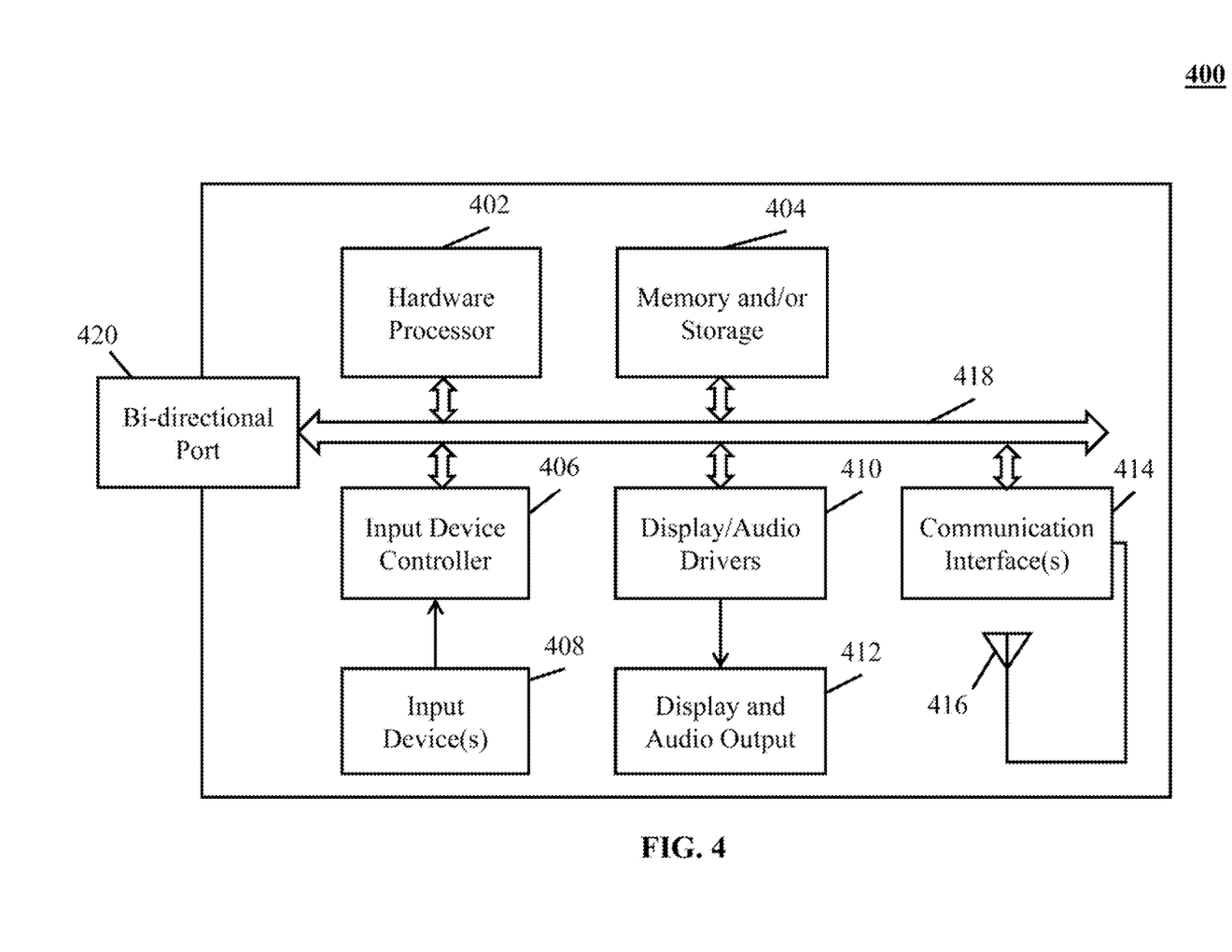
FIG. 4 shows an example of an illustrative system suitable for implementation of the mechanisms described herein for controlling a bi-directional HDMI port in accordance with some implementations of the disclosed subject matter.

In some implementations, hardware processor 402 can include any suitable hardware processor, such as a microprocessor, a micro-controller, digital signal processor(s), dedicated logic, and/or any other suitable circuitry for controlling the functioning of a general purpose computer or a special purpose computer. In some implementations, hardware processor 402 can be controlled by a computer program stored in memory and/or storage 404. For example, the computer program can cause hardware processor 402 to determine whether a bi-directional HDMI port is connected to another HDMI port, determine whether the port is electrically coupled to an HDMI sink, an HDMI source, or another bi-directional HDMI port, cause the device having the bi-directional HDMI port to be set as a source and/or sink, and/or perform any other suitable actions. As another example, the computer program can cause hardware processor 402 to request that a user to set a device that includes a bi-directional HDMI port as a source and/or a sink based on instructions associated with a comparison of voltage differences at connector 118, and/or perform any other suitable actions.

Memory and/or storage 404 can be any suitable memory and/or storage for storing programs, data, and/or any other suitable information in some implementations. For example, memory and/or storage 404 can include random access memory, read-only memory, flash memory, hard disk storage, optical media, and/or any other suitable computer-readable medium.

Input device controller 406 can be any suitable circuitry for controlling and/or receiving input from one or more input devices 408 in some implementations. For example, input device controller 406 can be circuitry for receiving input from: a touch screen; one or more buttons; a computer mouse; a remote control; a computer keyboard; a voice recognition circuit; a microphone; a camera; an optical sensor; an accelerometer; a temperature sensor; a near field communication sensor, and/or any other type of input device.

Display/audio drivers 410 can be any suitable circuitry for controlling and/or driving output to one or more display/audio output circuitries 412 in some implementations. For example, display/audio drivers 410 can be circuitry for driving an LCD display, one or more speakers and/or audio outputs, an LED, or any other type of output device.

Communication interface(s) 414 can be any suitable circuitry for interfacing with one or more communication networks. For example, interface(s) 414 can include network interface card circuitry, wireless communication circuitry, and/or any other suitable type of communication network circuitry.

Antenna 416 can be any suitable one or more antennas for wirelessly communicating with a communication network in some implementations. In some implementations, antenna 416 can be omitted when not needed.

Bus 418 can be any suitable mechanism for communicating between two or more components 402, 404, 406, 410, and 414 in some implementations.

Bi-directional port 420 can be any suitable circuitry for communicating with a device through an HDMI connection for transmitting and/or receiving audio content and/or video content, and/or any other suitable content or instructions. For example, bi-directional port 420 can include any suitable HDMI circuitry (e.g., for receiving audio and/or video, receiving and/or sending CEC messages, etc.). In some implementations, hardware processor 402 can send and receive data through bi-directional port 420 or any other communication links using, for example, a transmitter, receiver, transmitter/receiver, transceiver, or any other suitable communication device. As another example, bi-directional port 420 can be connected to another bi-directional port and send request data to hardware processor 402 for a user to set the device as an HDMI sink or a source. Hardware processor 402 can retrieve data such as a user interface from memory and/or storage 404 and present the information to a user through a display and audio output 412.

Any other suitable components can be included in hardware 400 in accordance with some implementations.

Figure 5:
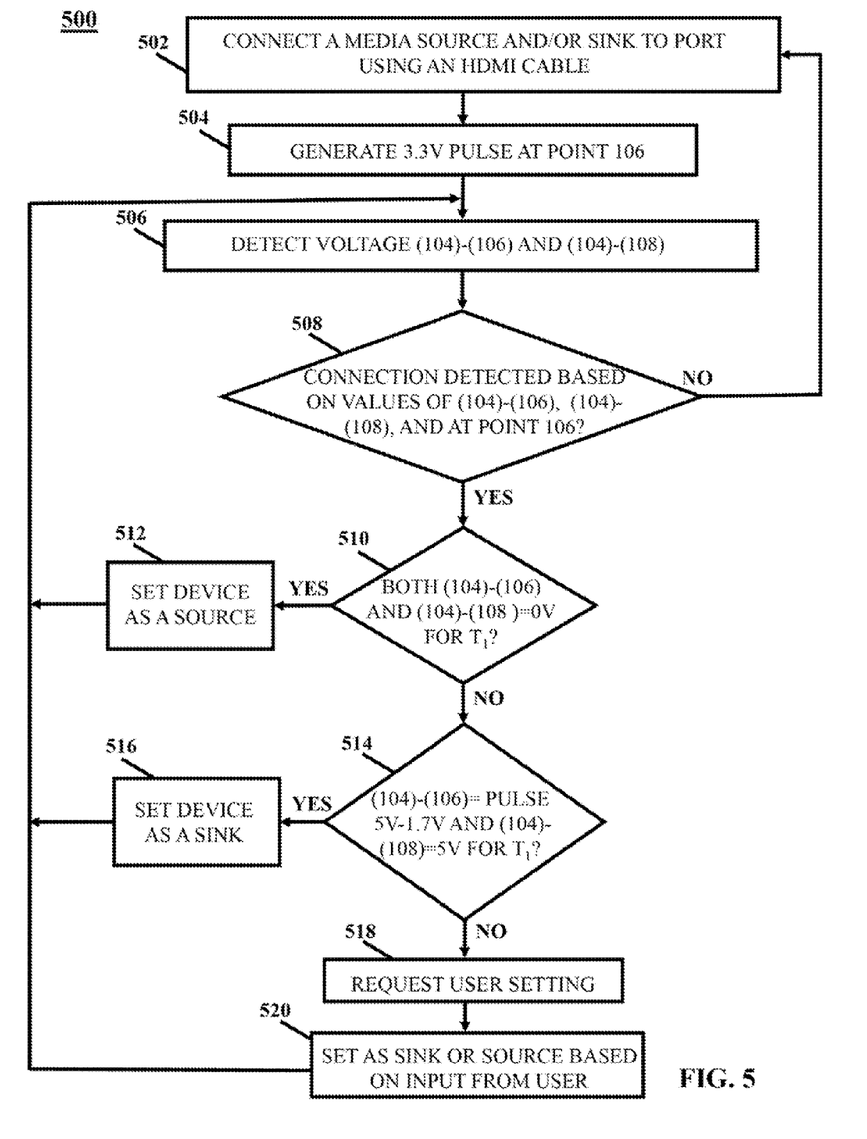
FIG. 5 shows an example of a process for controlling a bi-directional HDMI port in accordance with some implementations of the disclosed subject matter.

FIG. 5 shows an example 500 of a process for controlling a bi-directional HDMI port (such as bi-directional HDMI port 130 as described above) in accordance with some implementations of the disclosed subject matter. Process 500 can detect that bi-directional HDMI port 420 is connected to another device, determine voltage differences between pins in connector 118, compare the voltage differences, and cause the device to be set as a source or a sink based on the comparison. Process 500 can be executed by any suitable device in some implementations, such as a general purpose computer, a portable computer, a tablet computer, and/or a mobile phone, in some implementations. As shown, at 502, process 500 can begin when bi-directional HDMI port 420 is connected, for example, using an HDMI cable to an HDMI port of a sink, an HDMI port of a source, a bi-directional HDMI port of a sink/source, and/or any other suitable device.

At 504, process 500 can cause a 3.3 Volts pulse signal with a frequency of 1 Hertz to be generated. For example, in some implementations a signal generator can be coupled to point 106. Any suitable technique or combination of techniques can be used to generate the pulse signal.

At 506, process 500 can detect voltage differences at points 104 and 106 and points 104 and 108 in the circuit of bi-directional HDMI port 130 as shown in and described in connection with FIGS. 1A-1C. In some implementations, process 500 can use any suitable technique or combinations of techniques to detect the voltages and/or voltage differences. For example, detection of the voltage can be done using any suitable voltage detector, such as a CMOS voltage detector, a comparator, and/or a non-contact voltage detector.

At 508, process 500 can determine whether bi-directional HDMI port 130 is connected to an HDMI connector and/or any other suitable connector and/or that a previously detected connection is no longer detected. Process 500 can detect a connection based on the values of the voltage differences (104)-(106) and (104)-(108) and the voltage at point 106.

If process 500 determines, at 508, that the voltage difference (104)-(106) is 0 Volts and that the voltage difference (104)-(108) has the same frequency as the voltage at point 106 ("NO" at 508) then process 500 can determine that bi-directional HDMI port 420 is not connected to a device such as an HDMI source and/or sink. Process 500 can return to 502 where bi-directional HDMI port 420 can connect using an HDMI cable or other suitable connection to an HDMI port of a sink, an HDMI port of a source, a bi-directional HDMI port of a sink/source, and/or any other suitable device.

Otherwise, if process 500 determines at 508 that a connection is detected ("YES at 508"), process 500 can proceed to 510 and determine whether voltage differences between points 104 and 106 and points 104 and 108 in the circuit of bi-directional HDMI port 130 is 0 Volts during a period of time (e.g., period $T_1$ of FIGS. 1B, 2B, and 3B) after the connection is established.

If process 500 determines at 510 that the voltage difference between points 104 and 106 and points 104 and 108 during period of time $T_1$ is 0 Volts ("YES" at 512), process 500 can set the device that includes the bi-directional HDMI port to act as a source using any suitable hardware, firmware and/or software at 512. For example, in some implementations, hardware processor 402 can retrieve instructions from memory and/or storage 404 that can cause audio data and/or video data to be transmitted by HDMI port 420 of the device executing process 500. As another example, hardware processor 402 can execute instructions to disable display and/or audio output because the audio data and/or video data that would be presented is not being presented by the same device.

Process 500 can return to 506 from setting the device as a source at 512 in order to determine if the device continues to be connected to a sink using bi-directional HDMI port 420. For example, in some implementations, as long as voltage difference (104)-(106) is a pulse signal with a high value of 5 Volts and a low value of 1.7 Volts and voltage difference (104)-(108) is at 0 Volts, process 500 can determine that the source device continues to be detected as connected to a sink using bi-directional HDMI port 420 and process 500 can return to 506. Otherwise, if different values are detected, process 500 can determine that the device is no longer connected to a sink and can return to 506 to determine whether another connection is detected.

Otherwise, if process 500 determines at 510 that the voltage differences between points 104 and 106 and points 104 and 108 during the period of time $T_1$ in the circuit of bi-directional HDMI port 130 is not 0 Volts ("NO" at 510), process 500 can proceed to 514.

Process 500 can proceed to 514 and determine whether a voltage difference between points 104 and 106 is a pulse with a high value at 5 Volts and a low value at 1.7 Volts in the circuit of bi-directional HDMI port 130 and voltage difference between points 104 and 108 is 5 Volts during a period of time $T_1$ beginning when an HDMI sink cable is plugged in.

If process 500 determines at 514 that the voltage difference between points 104 and 106 is a pulse with a high value at 5 Volts and a low value at 1.7 Volts and the voltage difference between points 104 and 108 is 5 Volts ("YES" at 514), process 500 can set the device that includes the bi-directional HDMI port to act as a sink device at 516. The device can be set using any suitable hardware, firmware and/or software. For example, in some implementations, hardware processor 402 can retrieve instructions from memory and/or storage 404 that can disable certain communication interfaces because the audio data and/or video data that would be presented is being presented by the same device.

Process 500 can return to 506 from setting the device as a sink at 516 in order to determine if the device continues to be connected to a source using bi-directional HDMI port 420. For example, in some implementations, as long as voltage difference (104)-(106) is a pulse signal with a high value of 3.3 Volts and a low value of 1.7 Volts and voltage difference (104)-(108) is at 0 Volts, process 500 can determine that the device can continue to be detected as connected to a source using bi-directional HDMI port 420 and process 500 can return to 506. Otherwise, if different values are detected, process 500 can determine that the device is no longer connected to a source and can return to 506 to determine whether another connection is detected Otherwise, if process 500 determines at 514 that the voltage difference between points 104 and 106 is not a pulse with a high value at 5 Volts and a low value at 1.7 Volts and the voltage difference between point 104 and point 108 during a period of time $T_1$ in the circuit of bi-directional HDMI port 130 is not 5 Volts ("NO" at 514), process 500 can proceed to 518 and request that a user set the device to act as a sink or a source. In some implementations, for example, a user can be prompted by a user interface to input a selection for a device using any suitable input device, select a position of a mechanical switch, and/or in any other suitable manner. Upon selection of whether to set the device including bi-directional HDMI port 420 as a sink or source device at 520, process 500 can set the bi-directional HDMI port to act as a sink or a source based on the selection and then proceed to return to 506 to determine whether bi-directional HDMI port 130 is connected to an HDMI connector and/or any other suitable connector.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

It should be understood that the above described steps of the process of FIG. 5 can be executed or performed in any order or sequence not limited to the order and sequence shown and described in the figures. Also, some of the above steps of the process of FIG. 5 can be executed or performed substantially simultaneously where appropriate or in parallel to reduce latency and processing times.

It should be noted that, as used herein, voltages and measurements of voltage differences are approximate values and may vary slightly in a device. The voltages and voltage differences, used herein, are merely given as examples, and any suitable value, or any suitable combination of values can be used with the mechanisms described herein.

It should also be noted that, as used herein, the term mechanism can encompass hardware, software, firmware, or any suitable combination thereof.

Accordingly, methods, systems, and media for controlling a bi-directional HDMI port are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for controlling a High-Definition Multimedia Interface (HDMI) port in a device connected to an HDMI connector, the method comprising:
   providing a voltage signal at a first pin of the HDMI port, wherein the voltage signal has a first frequency;
   detecting a voltage at the first pin;
   detecting a voltage at a second pin of the HDMI port;
   comparing the voltage at the first pin to the voltage at the second pin;
   determining, based on the comparison of the voltage at the first pin to the voltage at the second pin, whether the HDMI port of the device is connected to an HDMI source device or an HDMI sink device;
   in response to determining that the HDMI port is connected to an HDMI source device, causing the HDMI port to act as an HDMI sink; and
   in response to determining that the HDMI port is connected to an HDMI sink device, causing the HDMI port to act as an HDMI source.

2. The method of claim 1, further comprising:
   determining based on the comparison of the voltage at the first pin to the voltage at the second pin that the HDMI port of the device is connected to a bi-directional HDMI port; and
   causing the device comprising the HDMI port to prompt a user to set the HDMI port to act as an HDMI source or an HDMI sink based on the determination that the HDMI port is connected to the bi-directional HDMI port.

3. The method of claim 1, wherein the HDMI port acts as a sink for multimedia data during a first period of time during which the HDMI port is connected to an HDMI source and acts as a source during a second period of time during which the HDMI port is connected to an HDMI sink.

4. The method of claim 1, wherein the first pin is pin 18.

5. The method of claim 1, wherein the second pin is pin 19.

6. The method of claim 1, wherein a switch is coupled between the first pin and the second pin.

7. The method of claim 1, wherein a voltage source is coupled to the first pin of the HDMI port, wherein the voltage provides a signal having a magnitude of about 5 Volts and a frequency of about 0 Herzt.

8. The method of claim 1, wherein the voltage signal provided to the first pin has a magnitude of about 3.3 Volts and a frequency of about 1 Hertz.

9. The method of claim 1, wherein the HDMI port is set as a sink based on the difference between the voltage at the first pin and the voltage at the second pin being about 5 Volts.

10. The method of claim 1, wherein the HDMI port is set as a source based on the difference between the voltage at the first pin and the voltage at the second pin being about 0 Volts.

11. The method of claim 1, wherein the device comprising the HDMI port prompts a user to set the HDMI port to act as either a sink or a source if the difference between the voltage at the first pin and the voltage at the second pin is a pulse signal having a magnitude of about 3.3 Volts.

12. A system for controlling a High-Definition Multimedia Interface (HDMI) port in a device connected to an HDMI connector, the system comprising:
    a first pin of the HDMI port;
    a second pin of the HDMI port;
    a voltage source coupled to the first pin that provides a voltage signal having a first frequency; and
    at least one hardware processor that:
       detects a voltage at the first pin;
       detects a voltage at the second pin;
       compares the voltage at the first pin to the voltage at the second pin;
       determines, based on the comparison of the voltage at the first pin to the voltage at the second pin, whether the HDMI port of the device is connected to an HDMI source device or an HDMI sink device;
       in response to determining that the HDMI port is connected to an HDMI source device, causes the HDMI port to act as an HDMI sink; and
       in response to determining that the HDMI port is connected to an HDMI sink device, causes the HDMI port to act as an HDMI source.

13. The system of claim 12, wherein the at least one hardware processor also:
    determines, based on the comparison of the voltage at the first pin to the voltage at the second pin, that the HDMI port of the device is connected to a bi-directional HDMI port; and
    causes the device comprising the HDMI port to prompt a user to set the HDMI port to act as an HDMI source or an HDMI sink based on the determination that the HDMI port is connected to the bi-directional HDMI port.

14. The system of claim 12, wherein the hardware processor causes the HDMI port acts as a sink for multimedia data during a first period of time during which the HDMI port is connected to an HDMI source and causes the HDMI port to act as a source during a second period of time during which the HDMI port is connected to an HDMI sink.

15. The system of claim 12, wherein the first pin is pin 18.

16. The system of claim 12, wherein the second pin is pin 19.

17. The system of claim 12, further comprising a switch coupled between the first pin and the second pin.

18. The system of claim 12, further comprising a second voltage source that is coupled to the first pin of the HDMI port, wherein the second voltage source provides a signal having a magnitude of about 5 Volts and a frequency of about 0 Herzt.

19. The system of claim 12, wherein the first voltage source provides the signal to the first pin having a magnitude of about 3.3 Volts, wherein the first frequency is about 1 Hertz.

20. The system of claim 12, wherein the at least one hardware processor causes the HDMI port to be set as a sink based on the difference between the voltage at the first pin and the voltage at the second pin being about 5 Volts.

21. The system of claim 12, wherein the at least one hardware processor causes the HDMI port to be set as a source based on the difference between the voltage at the first pin and the voltage at the second pin being about 0 Volts.

22. The system of claim 12, wherein the at least one hardware processor prompts a user of the system to provide input to set the HDMI port to act as either a sink or a source if the difference between the voltage at the first pin and the voltage at the second pin is a pulse signal having a magnitude of about 3.3 Volts.

23. A non-transitory computer readable medium containing computer executable instructions that, when executed by a processor, cause the processor to perform a method for controlling a High-Definition Multimedia Interface (HDMI) port in a device connected to an HDMI connector, the method comprising:
- applying a voltage signal at a first pin of the HDMI port, wherein the voltage signal has a first frequency;
- detecting a voltage at the first pin;
- detecting a voltage at a second pin of the HDMI port;
- comparing the voltage at the first pin to the voltage at the second pin;
- determining, based on the comparison of the voltage at the first pin to the voltage at the second pin, whether the HDMI port of the device is connected to an HDMI source device or an HDMI sink device;
- in response to determining that the HDMI port is connected to an HDMI source device, causing the HDMI port to act as an HDMI sink; and
- in response to determining that the HDMI port is connected to an HDMI sink device, causing the HDMI port to act as an HDMI source.

* * * * *